(12) United States Patent
Barber

(10) Patent No.: US 10,147,332 B1
(45) Date of Patent: Dec. 4, 2018

(54) CONFIGURABLE POCKET CHART AND KIT

(71) Applicant: Robin J. Barber, Cottonwood, MN (US)

(72) Inventor: Robin J. Barber, Cottonwood, MN (US)

( * ) Notice: Subject to any disclaimer, the term of this patent is extended or adjusted under 35 U.S.C. 154(b) by 269 days.

(21) Appl. No.: 15/160,095

(22) Filed: May 20, 2016

Related U.S. Application Data

(60) Provisional application No. 62/164,923, filed on May 21, 2015.

(51) Int. Cl.
*G09B 29/00* (2006.01)
*G09B 1/06* (2006.01)
*G09B 19/00* (2006.01)

(52) U.S. Cl.
CPC .............. *G09B 1/06* (2013.01); *G09B 19/00* (2013.01)

(58) Field of Classification Search
USPC ....... 434/156, 236, 238, 365, 408, 413, 416, 434/428, 430; 40/605, 729
See application file for complete search history.

(56) References Cited

U.S. PATENT DOCUMENTS

| | | | | |
|---|---|---|---|---|
| 3,466,777 A | * | 9/1969 | Wistrand | A47F 11/02 40/605 |
| 3,571,999 A | * | 3/1971 | Downing | A47F 11/02 160/135 |
| 3,601,917 A | * | 8/1971 | Shankman | G09F 7/12 40/622 |
| 4,275,520 A | * | 6/1981 | Appleton | G09F 15/0068 40/605 |
| 4,493,174 A | * | 1/1985 | Arens | E04B 2/7405 160/351 |
| 4,532,727 A | * | 8/1985 | Klose | A47G 1/065 40/729 |
| 4,785,565 A | * | 11/1988 | Kuffner | A47F 5/105 160/135 |
| 5,533,902 A | * | 7/1996 | Miller | G09B 1/06 273/273 |
| 5,557,915 A | | 11/1996 | Feldman | |
| 5,682,695 A | * | 11/1997 | Hoffman | G09F 7/12 248/205.2 |
| 5,800,182 A | | 9/1998 | Carson et al. | |
| 5,987,825 A | * | 11/1999 | Rosen | G09F 15/0068 40/107 |

(Continued)

OTHER PUBLICATIONS

Learning Resources, Magnetic Pocket Chart Squares, Set of 4, https://www.learningresources.com/product/magnetic+pocket+chart+squares%2C+set+of+4.do?>ortby=bestSellers&refType=&from=Search&ecList=6&ecCategory=, prior to May 21, 2015.*

(Continued)

*Primary Examiner* — Kurt Fernstrom
(74) *Attorney, Agent, or Firm* — Deirdre M. Kvale; DMK Intellectual Property Law

(57) ABSTRACT

The present application discloses a configurable pocket chart and kit. As disclosed, the pocket chart is assembled from a plurality of panels connected through a hook and loop connection. In particular, the panels include an obverse side having a plurality of pockets and a loop surface on a reverse side of the panels formed of a loop fabric layer. Connector strips having hooks on an obverse surface connect to the loop surface on the reverse side of the panels to form the multiple panel pocket chart.

11 Claims, 17 Drawing Sheets

(56) References Cited

U.S. PATENT DOCUMENTS

| | | | | |
|---|---|---|---|---|
| 6,054,968 | A * | 4/2000 | De Matteo | G09F 15/0068 312/7.2 |
| 6,282,826 | B1 | 9/2001 | Richards | |
| 6,345,821 | B1 | 2/2002 | Labrot | |
| 6,390,714 | B1 | 5/2002 | Bradley et al. | |
| D466,935 | S | 12/2002 | Carson et al. | |
| 6,575,758 | B1 * | 6/2003 | Hastings | G09F 7/18 434/408 |
| 6,626,675 | B1 * | 9/2003 | Webber | G09B 1/02 434/156 |
| 7,160,600 | B2 * | 1/2007 | Shepard | A44B 18/0011 428/99 |
| 7,399,184 | B2 * | 7/2008 | Hester | B43L 1/00 434/408 |
| 7,632,103 | B2 * | 12/2009 | Williams | B43L 1/06 434/408 |
| 8,176,664 | B2 * | 5/2012 | Delmotte | G09F 15/0025 160/368.1 |
| 8,590,232 | B2 * | 11/2013 | Roche | B32B 3/06 52/238.1 |
| 8,596,600 | B2 * | 12/2013 | Spencer | A47B 97/001 248/447.1 |
| 2003/0000120 | A1 * | 1/2003 | McNamara | G09F 3/02 40/450 |
| 2004/0079005 | A1 | 4/2004 | Davis et al. | |
| 2004/0091849 | A1 * | 5/2004 | Gallant | A47B 97/001 434/408 |
| 2006/0019232 | A1 * | 1/2006 | Fischer | G09B 25/04 434/407 |
| 2008/0178507 | A1 | 7/2008 | Dean-Mcleod | |
| 2008/0270240 | A1 | 10/2008 | Chu | |
| 2009/0000169 | A1 | 1/2009 | Houssain et al. | |
| 2010/0101129 | A1 | 4/2010 | Smith | |

OTHER PUBLICATIONS

Learning Resources, Magnetic Pocket Chart Squares, Set of 4, https://www.learningresources.com/product/magnetic+pocket+chart+squares%2C+set+of+4.do?sortby=bestSellers&refType=&from=Search&ecList=6&ecCategory=, prior to May 21, 2015 (2 pages).

* cited by examiner

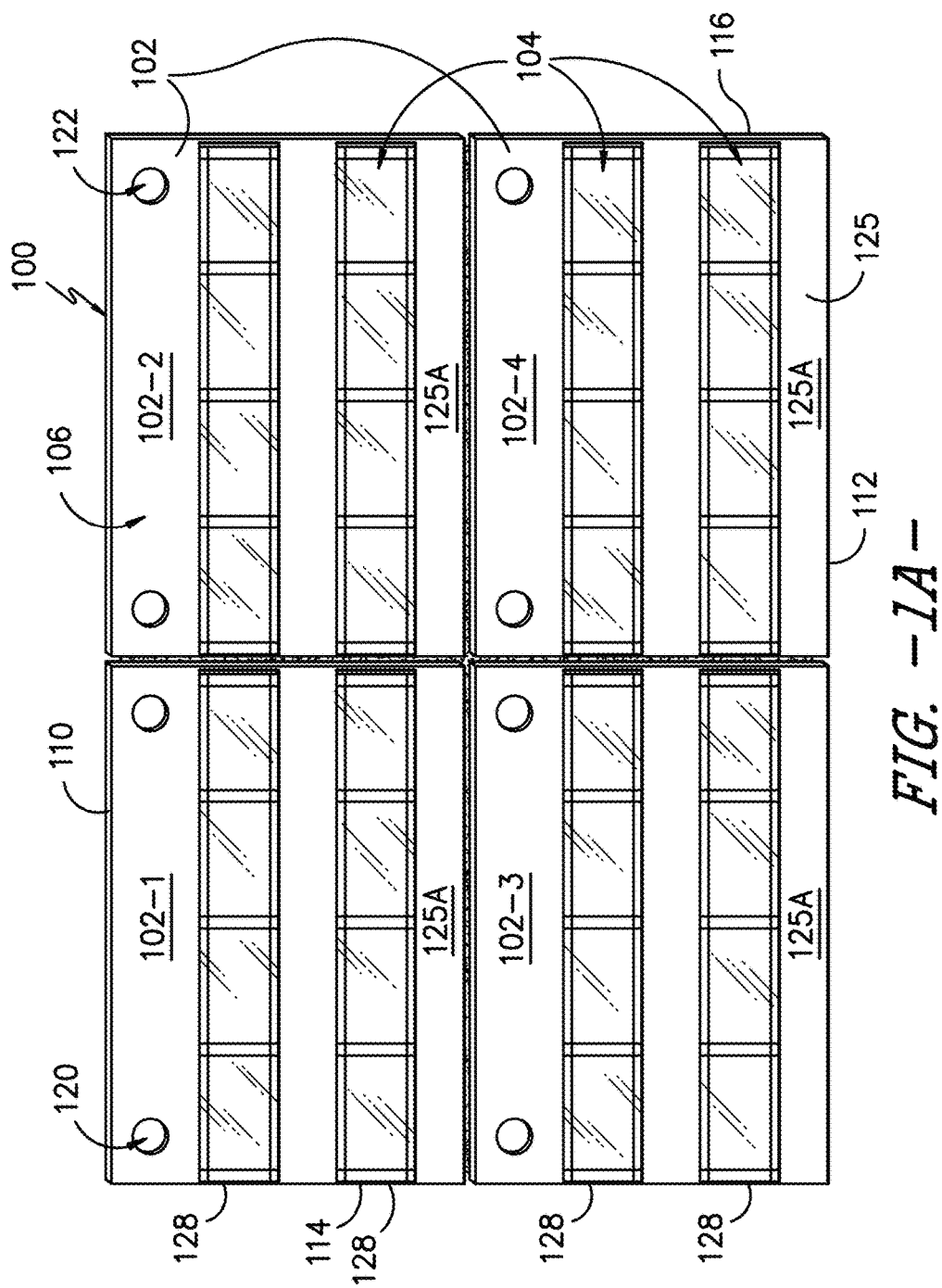
FIG. -1A-

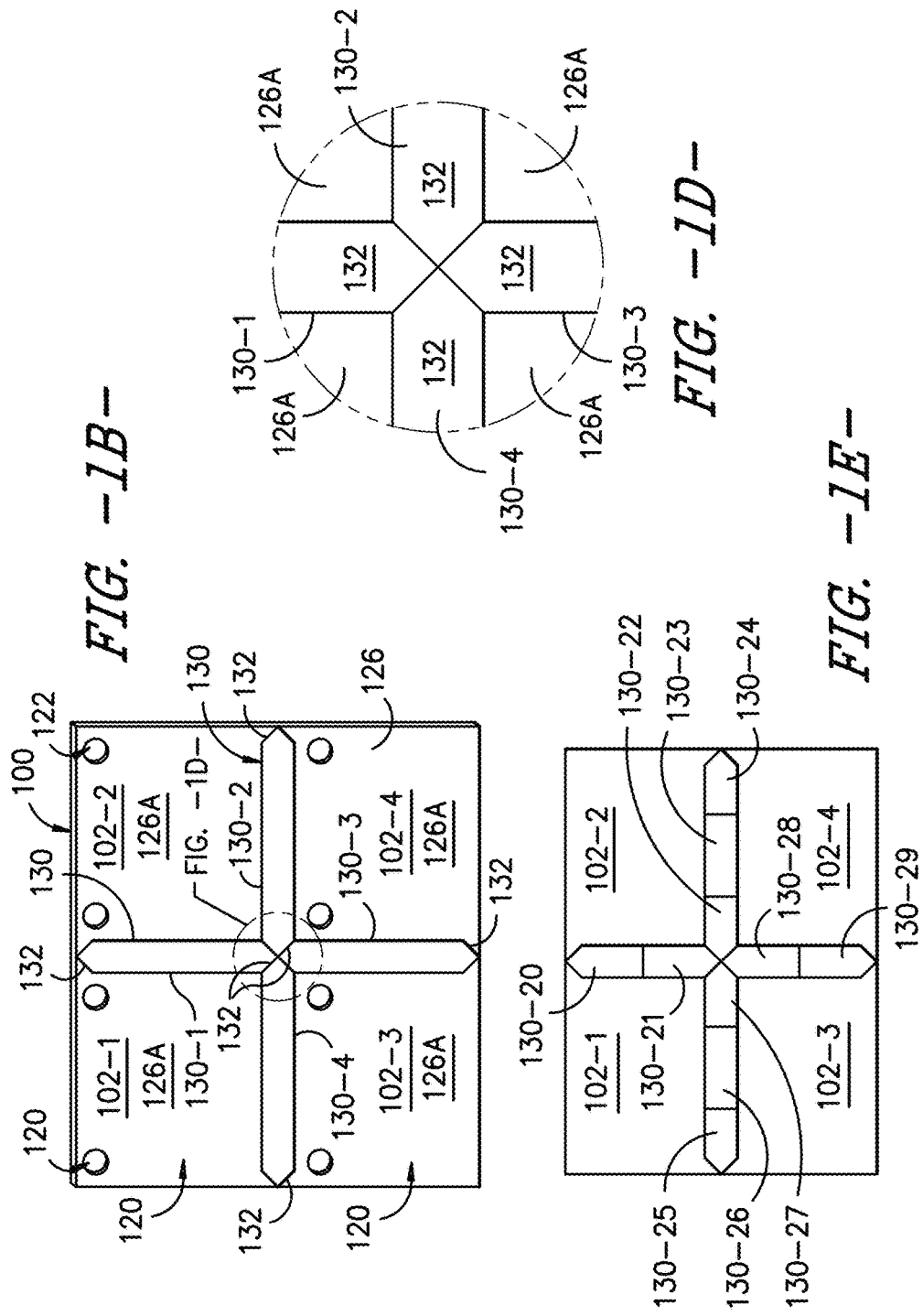

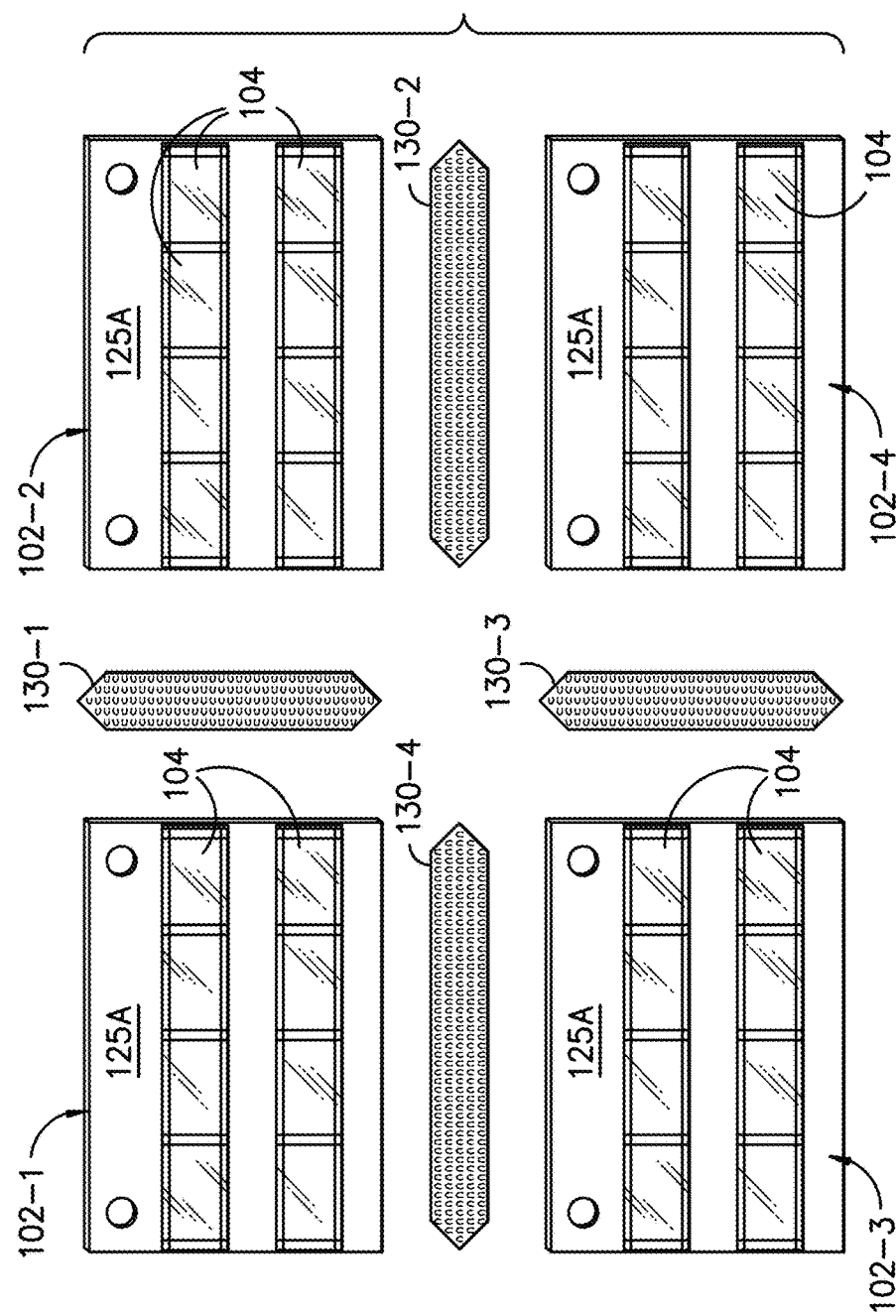
FIG. -1C-

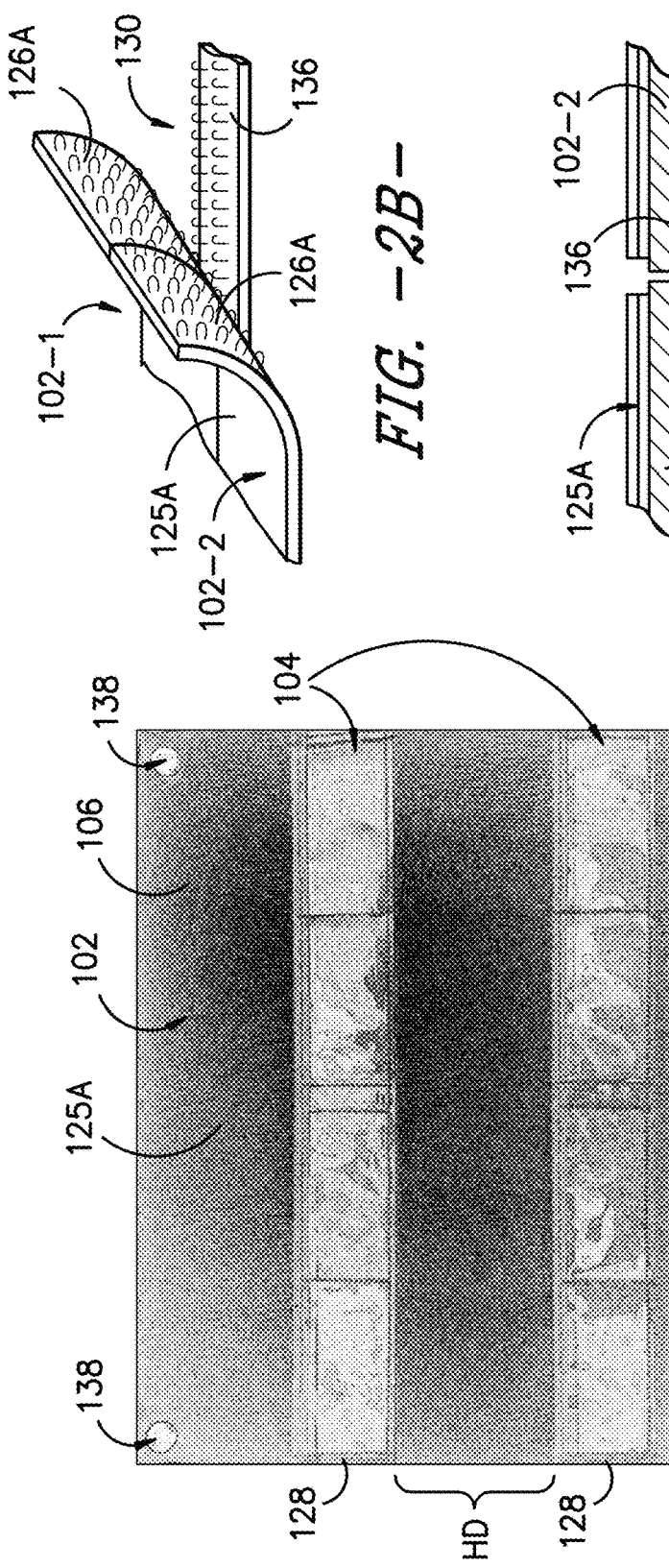
FIG. -2A-
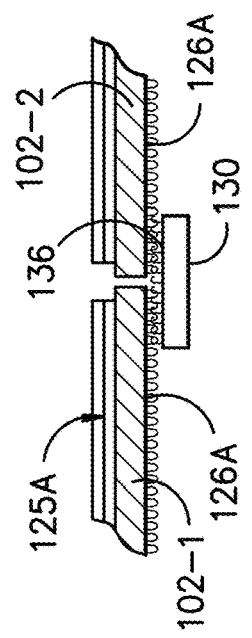
FIG. -2B-
FIG. -2C-

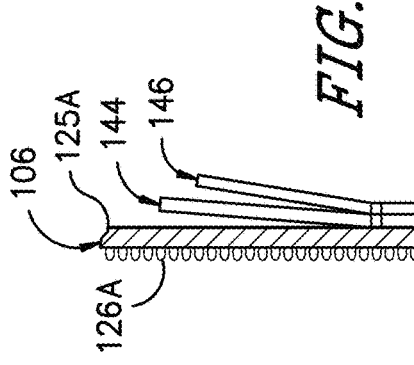
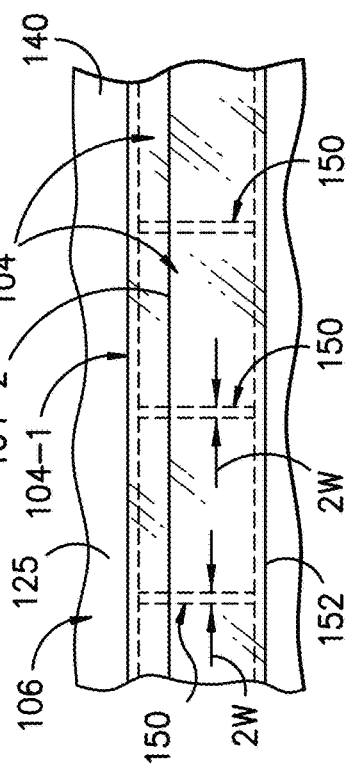
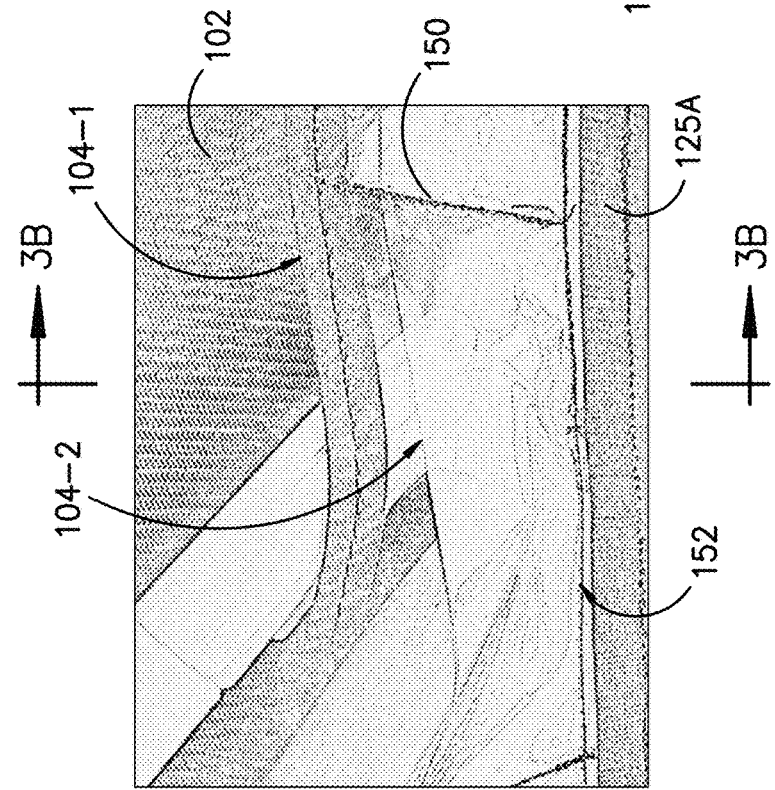
FIG. -3A-
FIG. -3B-
FIG. -3C-

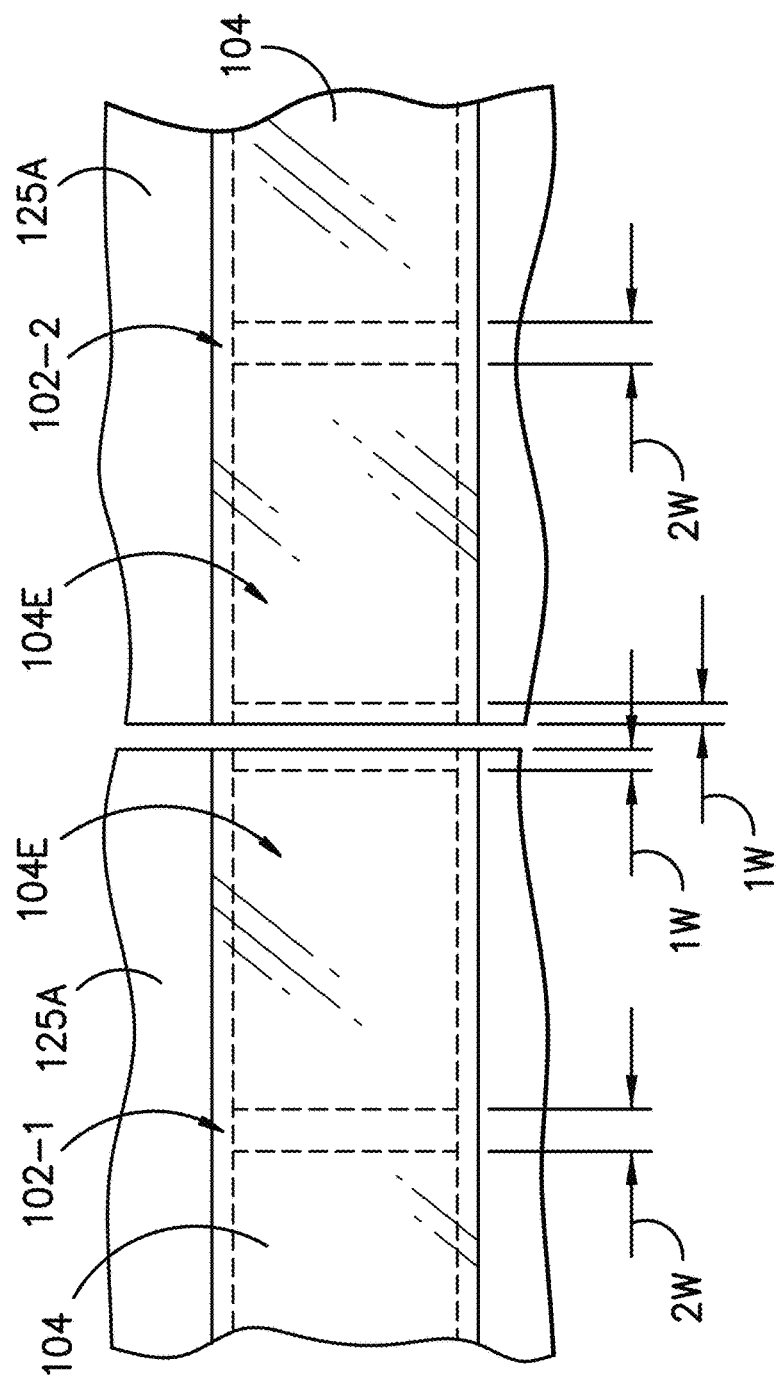

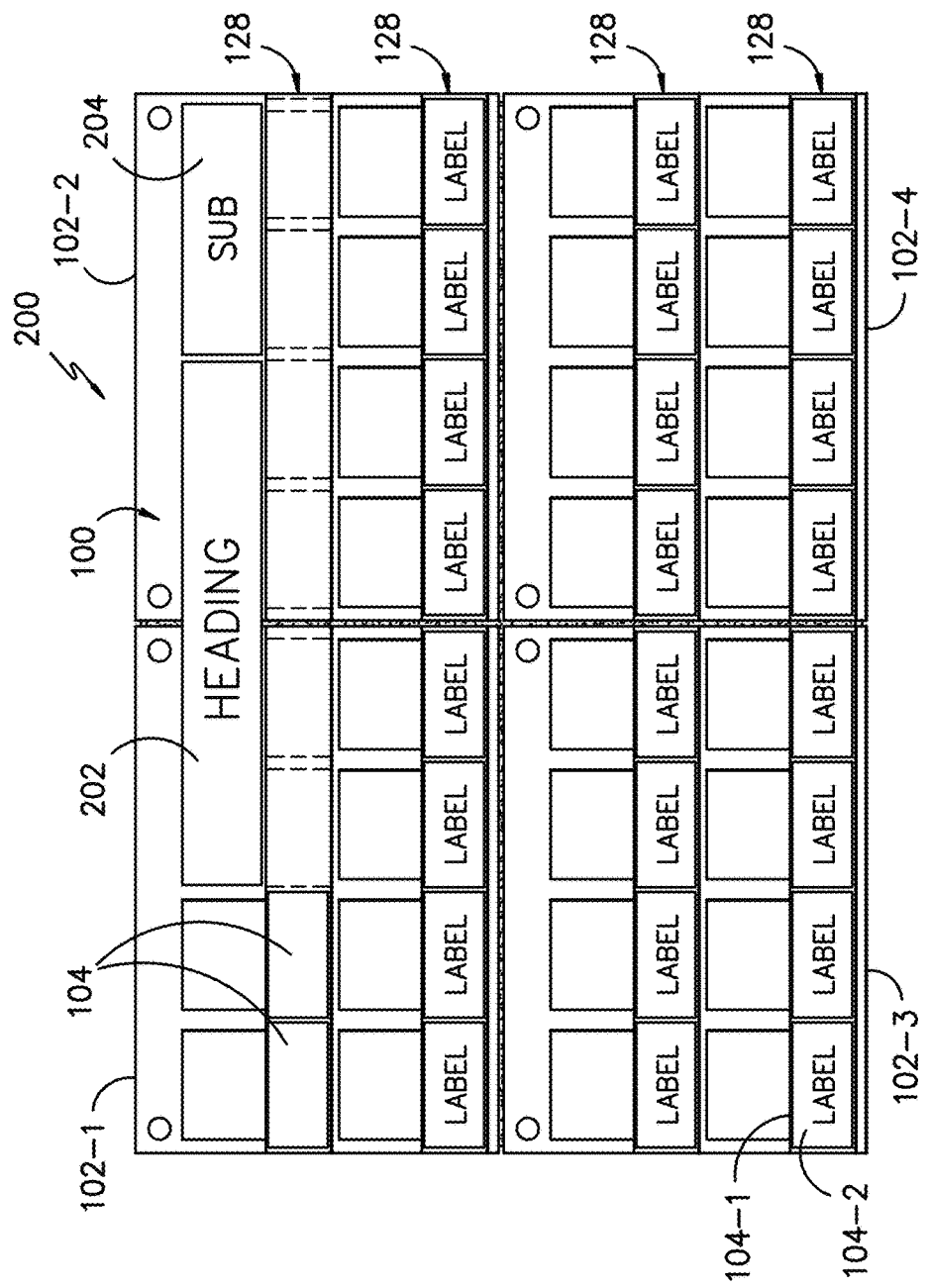
FIG. -4A-

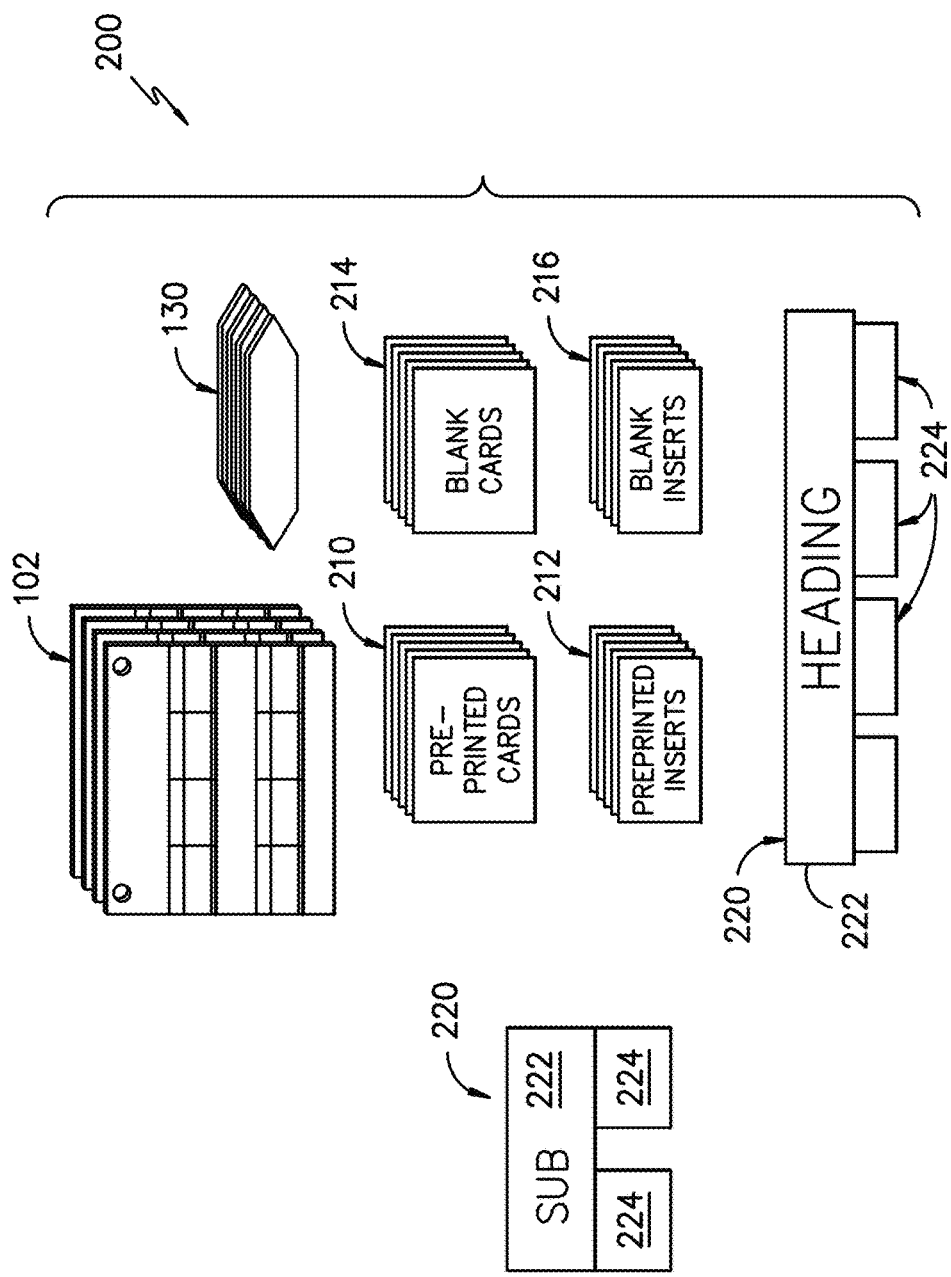
FIG. -4B-

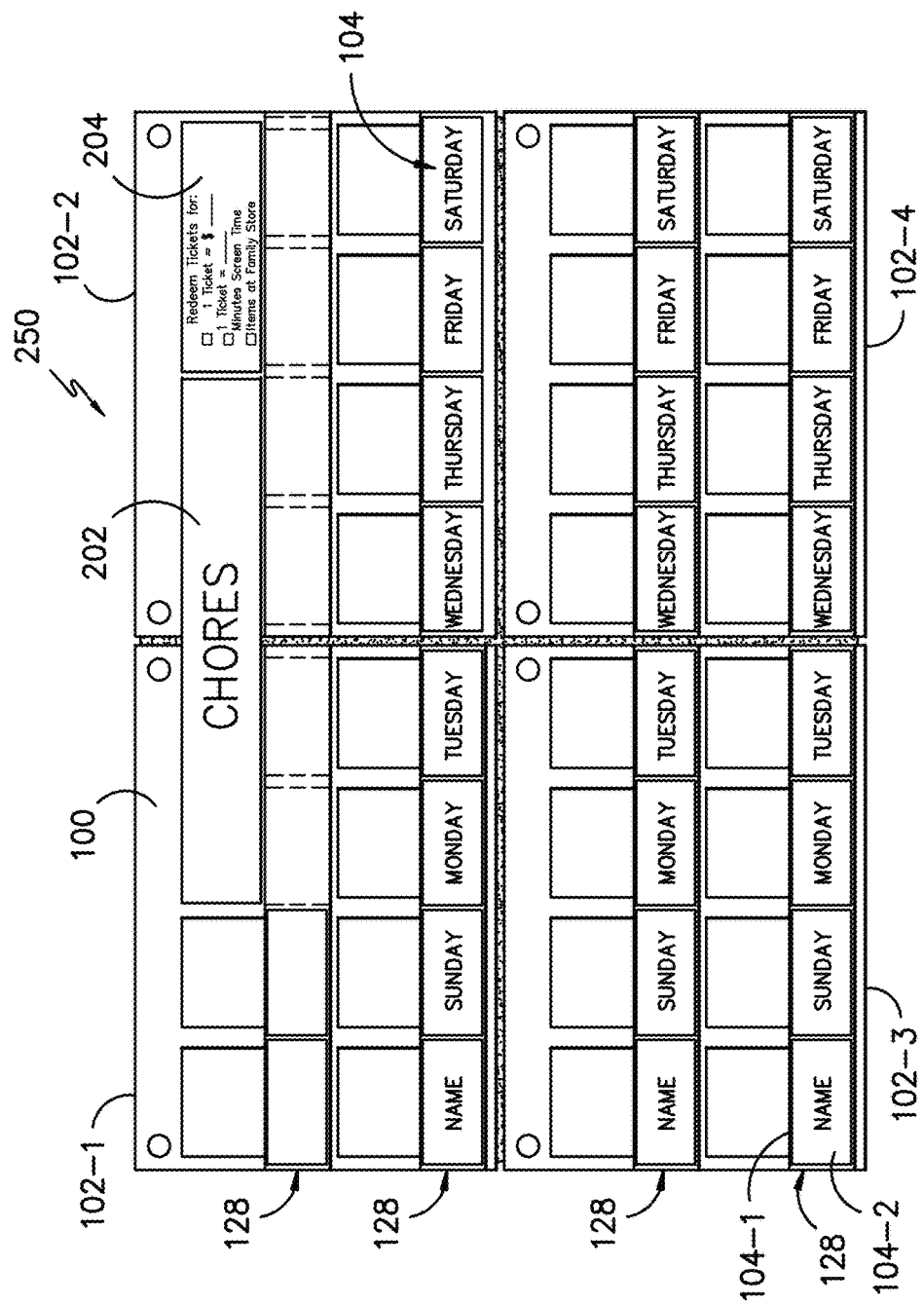
FIG. -5A-

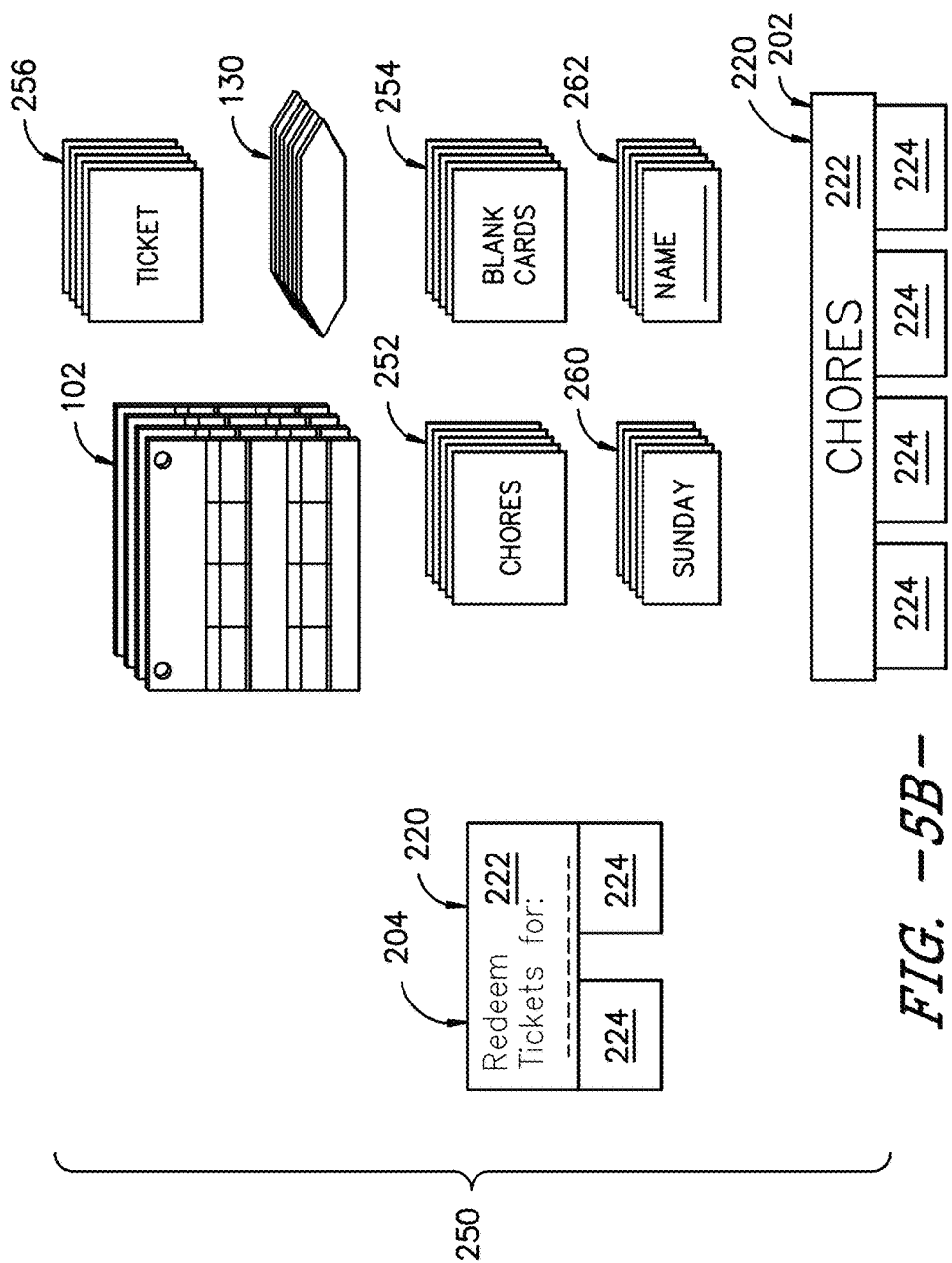
FIG. -5B-

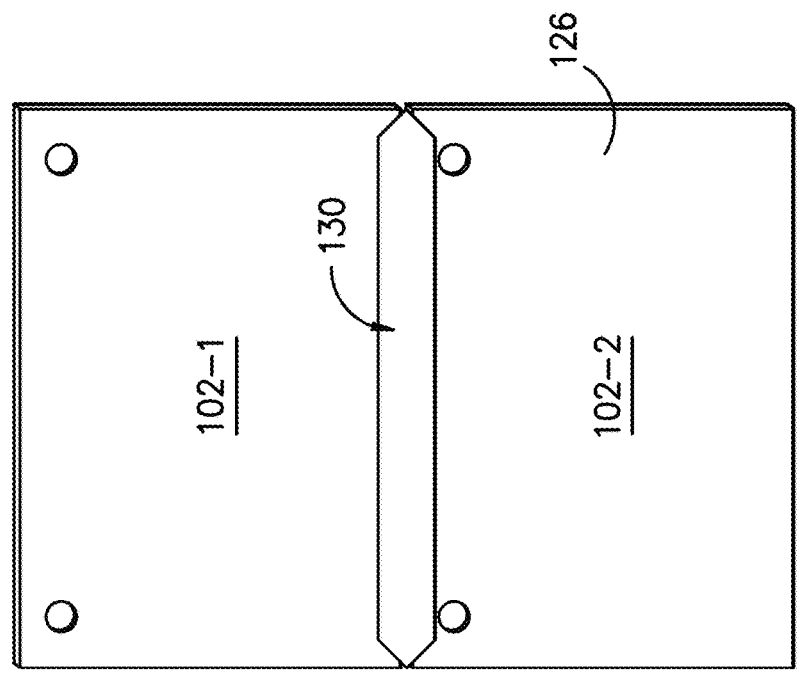
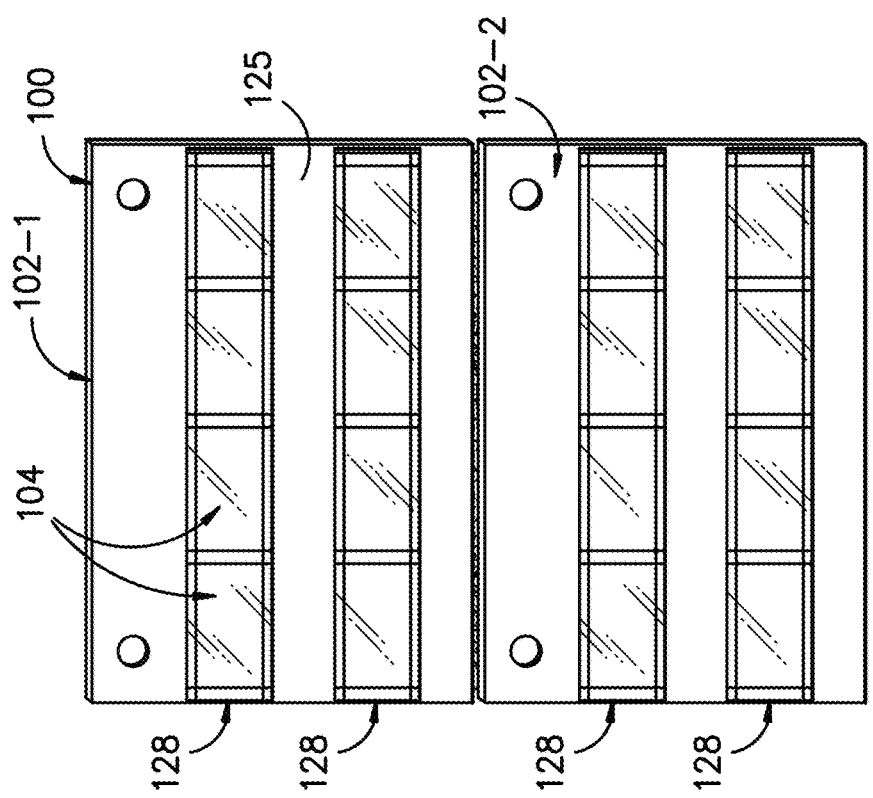
FIG. -6A-
FIG. -6B-

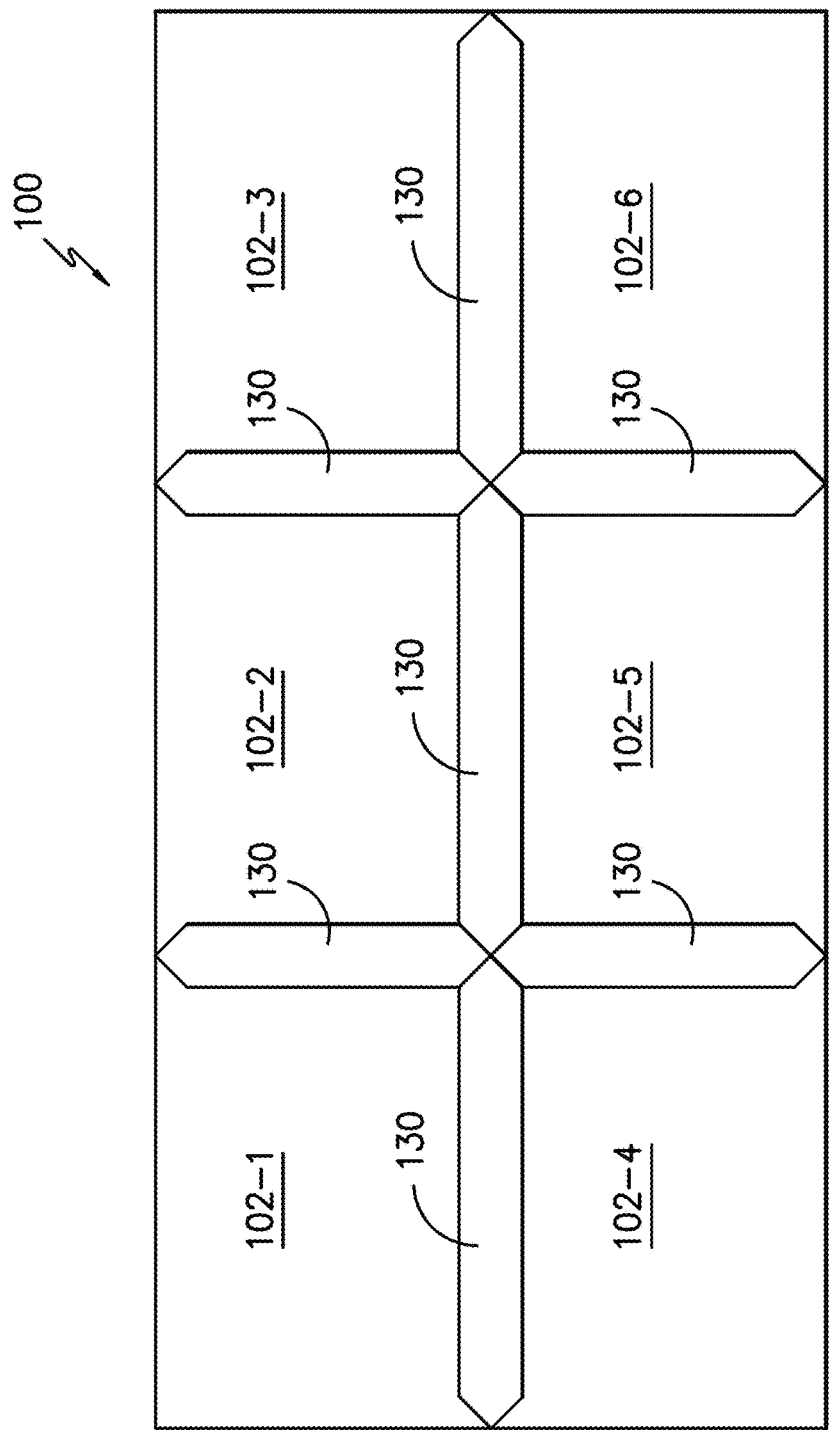
FIG. -6C-

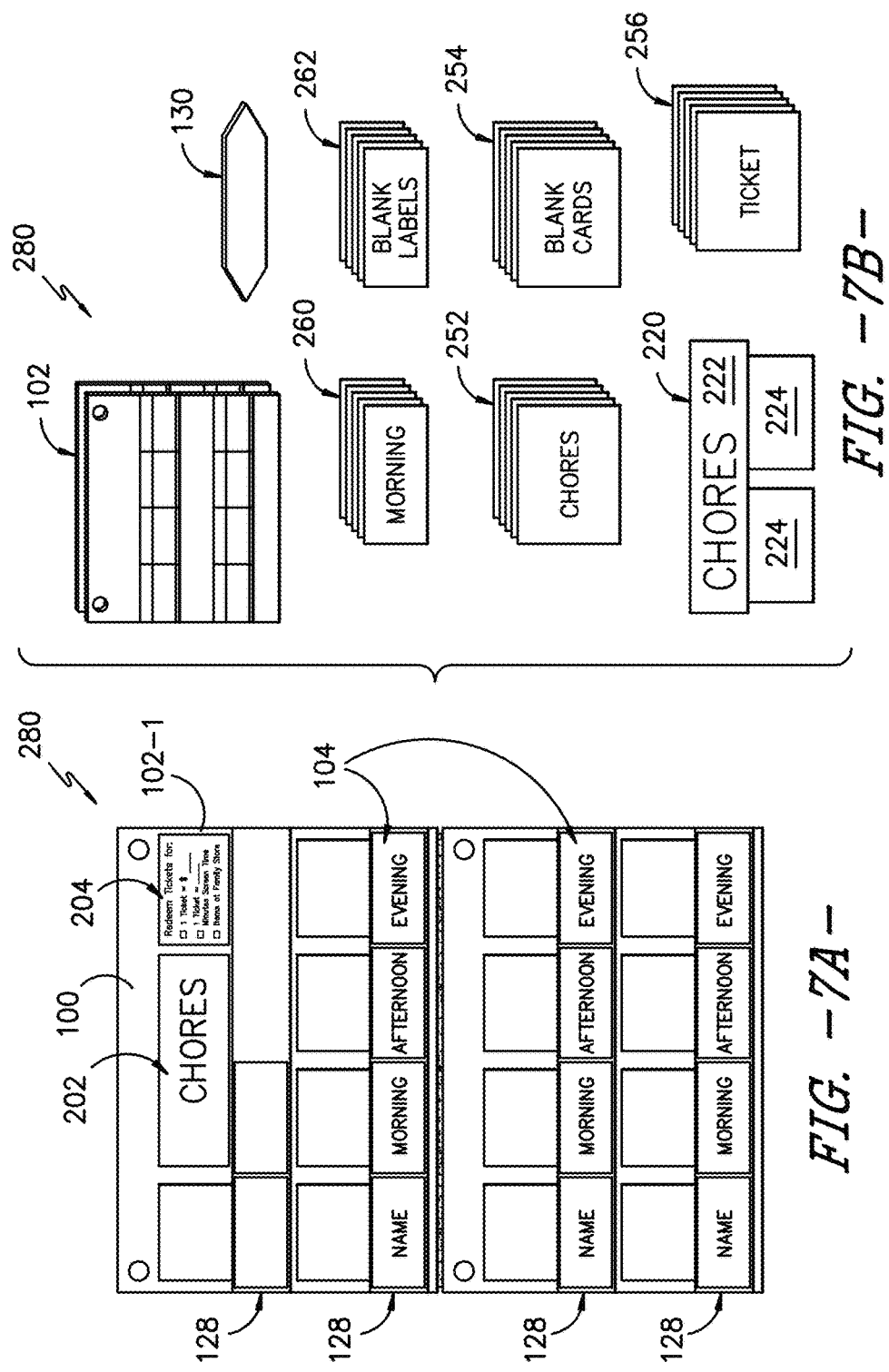

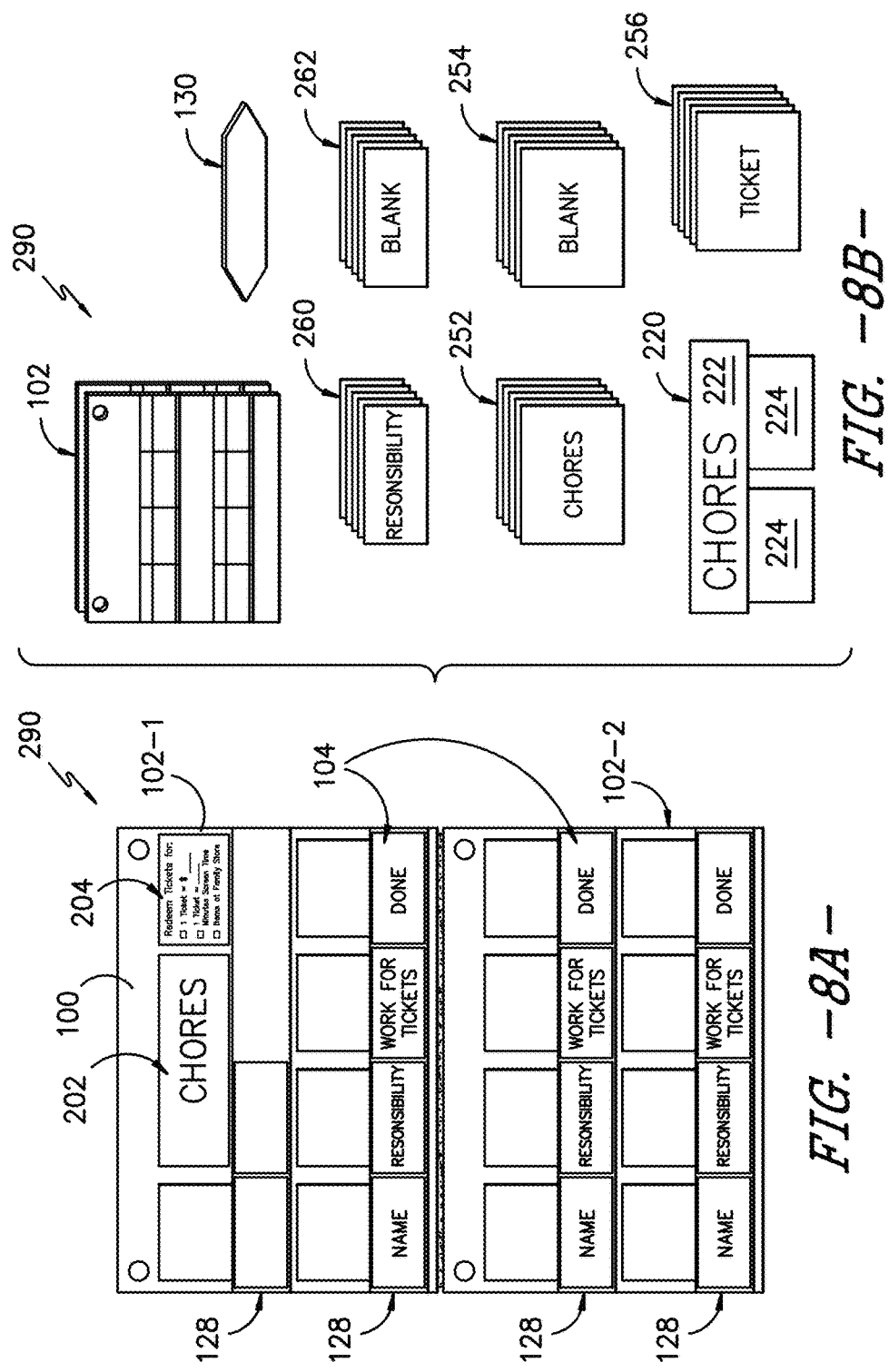

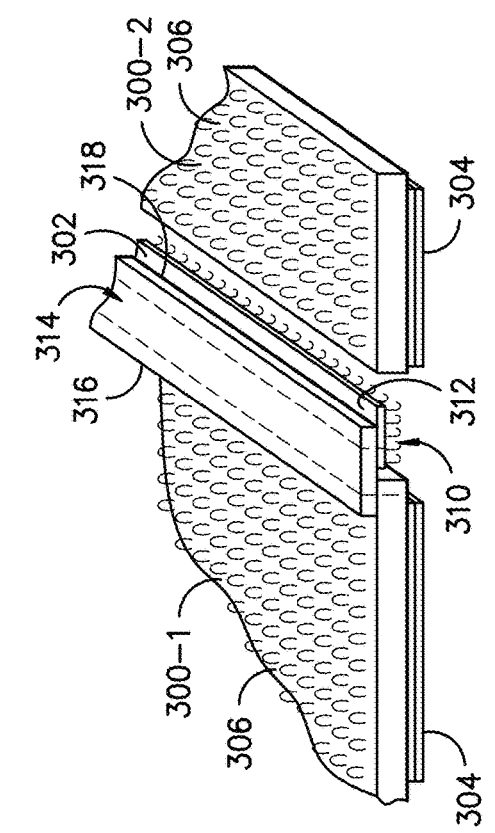
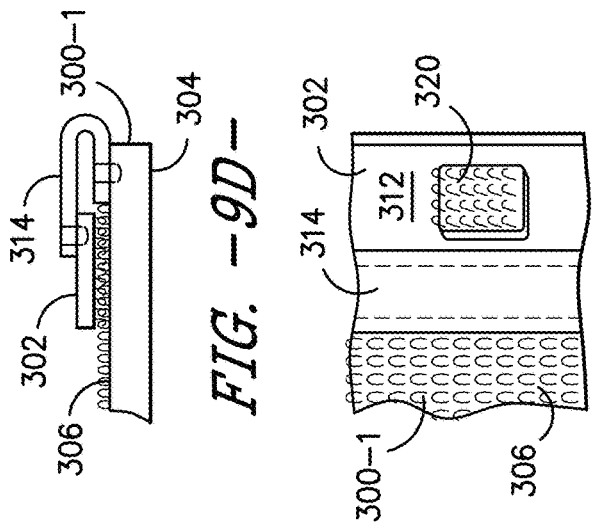
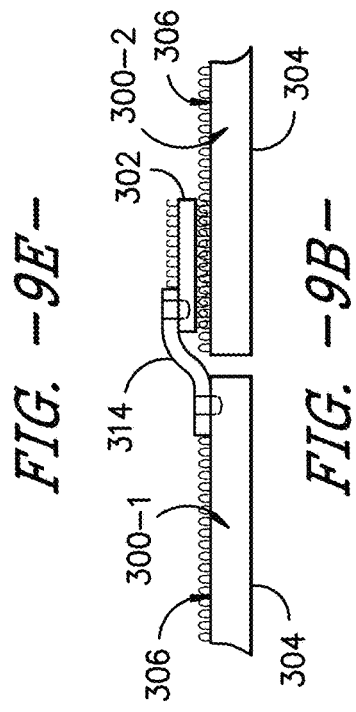
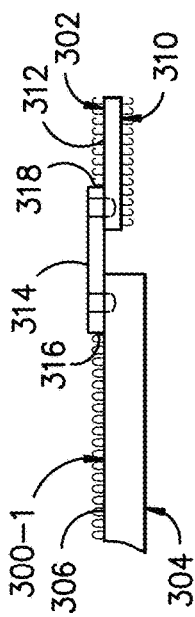
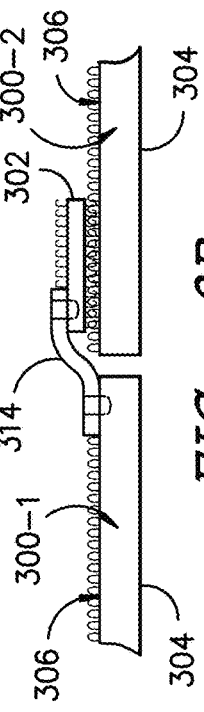
FIG. -9A-
FIG. -9B-
FIG. -9C-
FIG. -9D-
FIG. -9E-

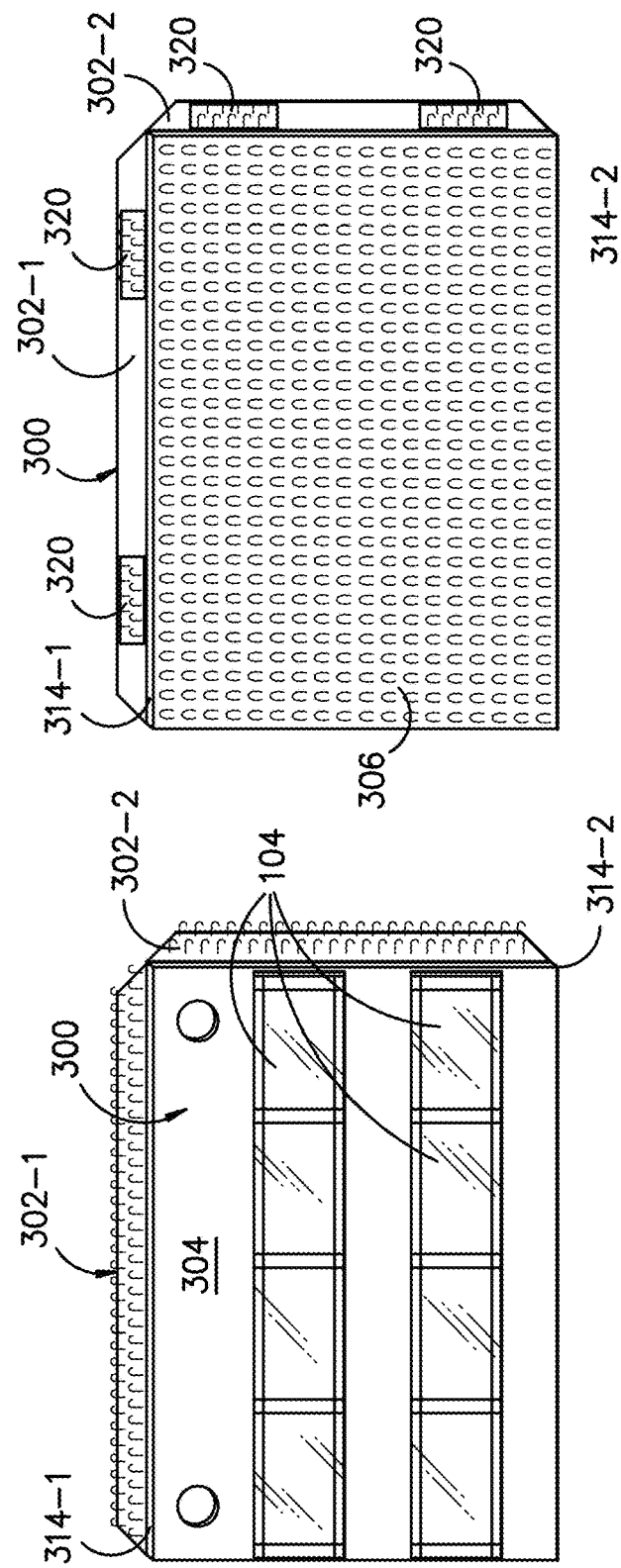

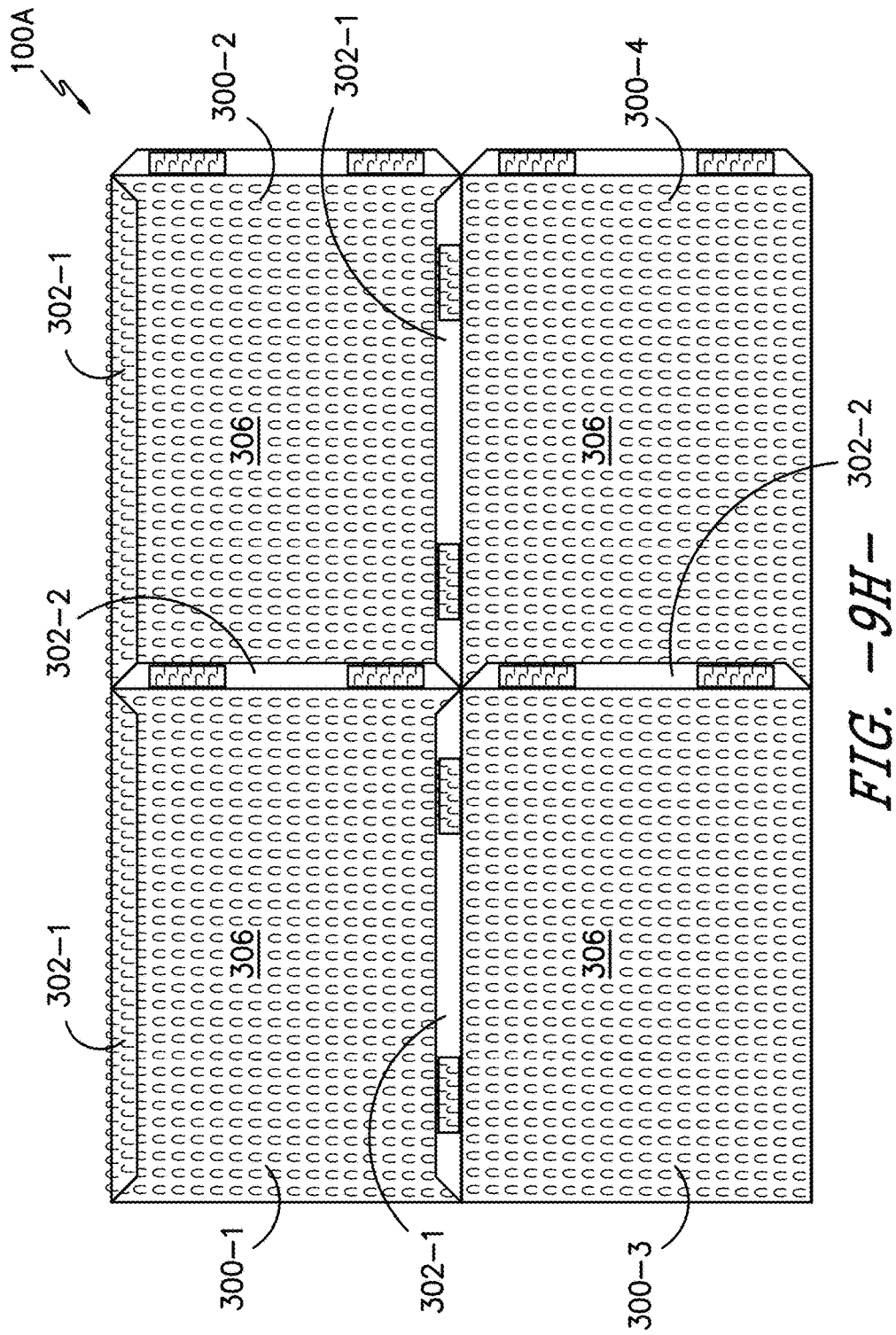
FIG. -9H-

US 10,147,332 B1

CONFIGURABLE POCKET CHART AND KIT

CROSS-REFERENCE TO RELATED APPLICATIONS

This application claims priority to U.S. provisional application Ser. No. 62/164,923 filed May 21, 2015 and entitled "CONFIGURABLE POCKET CHART AND KIT", the content of which is hereby incorporated by reference in its entirety.

BACKGROUND

Pocket charts are often used in classrooms for instructional purposes. The charts include a number of pockets on a support structure usually formed of a woven or non-woven fabric material such as nylon. Pocket charts typically have a fixed number of pockets and fixed number of rows of pockets for displaying material. In particular, the fixed number of pockets limits adaptation for a chore chart for different family members, different number of users, different educational class sizes and for different schedules.

SUMMARY

The application relates to a pocket chart. The present application discloses a configurable pocket chart and kit. As disclosed, the pocket chart is assembled from a plurality of panels connected through a hook and loop connection. In particular, panels include an obverse side having a plurality of pockets and a reverse side loop surface formed of a loop fabric layer. In disclosed embodiments, the panels are connected via connector strips having an obverse side and reverse side including hooks. The hooks connect to a loop surface on the reverse side of the panels to form a multiple panel pocket chart. In illustrated embodiments, the connector strips are sized to connect to the loop surface of adjacent panels. The application discloses panels having connector strips attached to the panels for connecting multiple panels to form the pocket chart.

Panels of the present application are used with a kit to provide a pocket chart for organizing chores. The kit includes a plurality of panels having inner and outer pockets. The kit includes pre-printed and blank inserts for the outer pockets and preprinted and blank cards for the inner pockets. As described the kit includes a placard having tabs sized and spaced for insertion into adjacent pockets to connect the placard to the pocket chart for use. In illustrated embodiments, the cards include chores or activities and the inserts correspond to the days of the week, time or other category to assign responsibility for chores on the cards. The above summary provides a description of features of the present application, however, the scope and content of the invention should not be limited to features discussed in the Summary and other attributes and features of the application will be apparent from the detailed description and claims.

BRIEF DESCRIPTION OF DRAWINGS

FIG. 1A is a schematic illustration of a pocket chart comprised of multiple panels forming a support structure for a plurality of pockets of the pocket chart.

FIG. 1B illustrates a reverse side of the pocket chart of FIG. 1A illustrating connection of the multiple panels to form the pocket chart.

FIG. 1C is an exploded view of the multiple panels and connector strips to connect the multiple panels to form the pocket chart shown in FIGS. 1A-1B.

FIG. 1D is a detailed illustration of an intersection of the connector strips connecting panels of the four panel pocket chart shown in FIG. 1C.

FIG. 1E illustrates another embodiment of a reverse side of a pocket chart having panels connected through multiple connector strips.

FIG. 2A is a detailed view of a panel including a plurality of pockets forming the rows of pockets of the pocket chart.

FIG. 2B is a detailed view illustrating connection of multiple panels via the connector strips shown in FIG. 1C.

FIG. 2C illustrates adjacent panels connected through a hook and loop connector using connector strips.

FIG. 3A illustrates an embodiment of the pockets on the connectable panels of the type shown in FIG. 2A.

FIG. 3B is a cross-sectional view taken along line 3B-3B of FIG. 3A illustrating a multiple layered structure forming a support structure and pockets of the connectable panels.

FIG. 3C is a detailed view of pockets connected to panels along seams.

FIG. 3D is a detailed view of a row of pockets formed via adjacent panels.

FIGS. 4A-4B illustrates a pocket chart kit including connectable panels to form the pocket chart and kit elements for use with the pocket chart.

FIGS. 5A-5B schematically illustrate an embodiment of a chore pocket chart kit for tracking and organizing chores.

FIGS. 6A-6B schematically illustrates an embodiment of a pocket chart formed of two connectable panels and FIG. 6C illustrates a pocket chart formed of six connectable panels.

FIGS. 7A-7B and FIGS. 8A-8B schematically illustrate embodiments of chore pocket chart kits including a pocket chart formed of two connectable panels as shown in FIGS. 6A-6B for tracking and organizing chores.

FIGS. 9A-9E illustrate another embodiment of the panels of the present application including a connector strip attached to the panels through a spine.

FIG. 9F illustrates an obverse side of a panel having a connector strip attached to a top edge and side edge of the panel.

FIG. 9G illustrates a reverse side of the panel illustrated in FIG. 9F.

FIG. 9H illustrates a reverse side of a pocket chart having four panels connected using connector strips attached to the panels as illustrated in FIGS. 9F-9G.

It should also be understood that the FIGURES are for illustration and not necessarily drawn to scale. In particular, the panels and kit elements shown in FIGS. 4B, 5B, 7B, 8B are not drawn to scale as the illustrative size of the panels is not to scale relative to the kit elements.

DETAILED DESCRIPTION OF ILLUSTRATIVE EMBODIMENTS

The present application relates to a pocket chart construction adaptable for different applications. As shown in FIGS. 1A-1B, the pocket chart 100 is formed of a plurality of panels 102. The panels 102 are connected to form the pocket chart having a plurality of pockets 104 formed on a support structure 106. Different numbers of panels are used to form different sized and shaped pocket charts 100. In the illustrated embodiment four panels 102-1, 102-2, 102-3, and 102-4 are connected to form a four panel pocket chart 100. The support structure 106 of the four panel pocket chart shown, includes a top edge 110 formed along top edge surfaces of panels 102-1, 102-2, a bottom edge 112 formed along bottom edge surfaces of panels 102-3, 102-4, a side edge 114 formed along side edge surfaces of panels 102-1, 102-3, and side edge 116 formed along side edge surfaces of panels 102-2, 102-4. In the illustrated embodiment shown, the support structure 106 includes hanger openings 120, 122 along the top edge 110 for hanging the chart 100 for display. The hanger openings 120, 122 are sized for various hanger elements such as wire, thread or hooks (not shown). Illustrative hooks are Command™ brand adhesive hooks available from 3M Company of St. Paul Minn., which are connected to the support structure 106 through openings 120, 122 to display the pocket chart. Application is not limited to hook hanger elements and other fastener elements can be used including Command™ brand adhesive strips also available from 3M Company of St. Paul.

The support structure 106 of the chart includes an obverse side 125 shown in FIG. 1A and reverse side 126 shown in FIG. 1B. Multiple panels 104 are connected to form the support structure 106. Each of the panels 102 has an obverse side 125A and a reverse side 126A which when the panels are connected form the obverse side 125 and reverse side 126 of the pocket chart 100. The obverse side 125 shown in FIG. 1A includes multiple rows 128 of pockets 104. In the embodiment shown, the chart 100 includes four rows 128 each row having eight pockets 104, although application is not limited to the particular configuration shown in FIG. 1A. The panels 102 are connected along the reverse sides 126A of panels 102 using connector strips 130 that join edges of adjacent panels 102 to form the pocket chart as shown in FIG. 1B.

FIG. 1C is an exploded view illustrating connection of the multiple panels 102 via connectors strips 130 to form the pocket chart 100. As previously shown, the connector strips 130 adhere to the reverse sides 126A of adjacent panels to connect panels 102-1, 102-2, 1-2-3, 102-4 to form the chart 100. In particular, the connector strips and panels are connected through a hook and loop connection formed on the connector strips and the reverse side 126A of the panels. In the illustrated embodiment, connector strip 130-1 connects panels 102-1, 102-2, connector strip 130-2 connects panels 102-2, 102-4, connector strip 130-3 connects panels 102-3, 102-4 and connector strip 130-4 connects panels 102-1, 102-3. In the illustrated embodiment, the connector strips 130 are formed of an elongate length having pointed ends 132. The pointed ends 132 allow an interlocking arrangement at the intersection of the panels 102 as shown in FIG. 1D. Use of pointed shape at both ends provides flexibility for connection of any number of panels 102 to form a desired size pocket chart, although application is not limited to the particular embodiment shown.

In another embodiment shown in FIG. 1E, a combination of different shaped connector strips connect panels 102-1, 102-2, 201-3 and 102-4. In particular, connector strips 130-20 and 130-21 connect panels 102-1 and 102-2, connector strips 130-22, 130-23, 130-24 connect panels 102-2, 201-4, connector strips 130-25, 130-26, 130-27 connect panels 102-1, 102-3 and connector strips 130-28, 130-29 connect panels 102-3, 102-4. In the embodiment shown, connector strips 130-23, 120-26 have opposed square shaped ends and connector strips 130-20, 130-21, 130-22, 130-24, 13-25, 130-27, 130-28, 130-29 have a tapered end and a square shaped end as shown. While a particular arrangement and design is shown for the connector strips, application is not limited to the particular embodiments shown. In an illustrated embodiment, a kit for assembling the pocket chart includes four panels 102-1, 102-2, 102-3 and 102-4 and twelve-four inch by one inch connector strips having a square shaped end and a tapered end and four-four inch long by one inch wide connector strips having opposed square ends. In an illustrated embodiment, 8 bullet nosed connector strips and 2 square end connector strips connect four panels. A pocket chart kit can include additional connector strips for expansion to connect additional or any number of pocket chart panels.

FIG. 2A illustrates an embodiment of a panel 102 including multiple rows 102 of pockets 104 on the obverse side 125A of the panel 102. The rows 128 each include an equal number of uniform sized pockets 104 spaced between the side edges of the panels 102. It should be understood that embodiments of the panels are not limited to a particular panel size or number of pockets 104. The reverse side 126A of the panel includes a loop material as shown in FIG. 2B, which adheres to hooks 136 on obverse surface of the connector strips 130 to form the hook and loop connection. The hooks 136 on the connector strips 130 adhere to the loops on the loop surface on the reverse side of panels 102-1, 102-2 to connect adjacent panels 102 as shown in FIGS. 2A-2B. As schematically shown in FIG. 2C, the connector strips 130 adhere to the loops on the reverse surface of panels 102-1, 102-2 so that the obverse and reverse surfaces of the panels 102-1, 102-2 are flush to provide a generally flat profile for the panels of the pocket chart when connected.

In an illustrated embodiment, the connector strips 130 are made of a Duragrip® brand hook fabric and the loop material is a Velcro® brand loop fabric. It should be understood that application is not limited to the placement of the loops on the panels 102 and hooks 136 on the connector strips 130 and that the panels 102 can include the hook material and the connector strips 130 the loop material to facilitate connection of the panels 102. Alternatively, the panels 102 and connector strips 130 can use other fastener elements to connect the panels 102 through the connector strips 130.

As shown in FIG. 2A, each panel 102 includes openings 138 to provide the display openings 120, 122 depending upon the arrangement of the panels 102 when connected and rows of pockets on the panels 102. Illustratively, the openings 138 are formed of grommets attached to the panel 102. In another embodiment, the pocket chart is displayed using one or more -permanent adhesive backed hook squares (not shown) having an adhesive layer or side and a hook layer or side. The adhesive layer is used to connect the one or more squares to a display surface or wall and the hook layer or side is used to connect the one or more squares to the loop material or surface on the reverse side of the panels. 102. It should be understood that application is not limited to adhesive backed hook squares having a square shape and other shaped semi-permanent adhesive backed products can be used.

FIG. 3A illustrates an embodiment of a panel 102 including an inner pocket 104-1 and an outer pocket 104-2 to form a nested pocket arrangement. The outer pocket 104-2 as shown is a clear pocket for inserting an insert label (not shown in FIG. 3A) and the inner pocket 104-1 is sized for insertion of cards associated with the insert or label in the outer pocket 104-2. As shown in the illustrated embodiment, a height of the outer pocket 104-2 is smaller than the inner pocket 104-1 so that an open end of the outer pocket 104-2 is spaced below an open end of the inner pocket 104-1. FIG. 3B is a cross-sectional view generally taken along lines 3B-3B of FIG. 3A. As shown in FIG. 3B, the panel 102 is formed of a single loop fabric layer 140 such as a Velcro® brand loop fabric forming the loop surface on the reverse side 126A of panel 102. Although a single layer support structure or panel is shown, application is not limited to a single layer structure shown.

The inner and outer pockets 104-1, 104-2 are formed via inner and outer pocket layers 144, 146 connected to the obverse side 125A of the panel or layer 140. The inner pocket layer 144 is formed of a solid material and the outer pocket layer 146 is formed of a clear plastic layer so that labels inserted therein are visible through the pocket 104-2. In another embodiment, both the inner and outer pocket layers 144, 146 are formed of a clear material. As shown in FIG. 3C, the inner and outer pocket layers 144, 146 are sewn to layer 140 to form side seams 150 and a bottom seam 152 to form a series or rows 128 of pockets 104 including a plurality of pockets spaced along a width of the panel between the side edges of the panel 102.

As shown in FIG. 3D, the pockets 104-1, 104-2 are spaced to provide a width 2 W between adjacent pockets 104-1, 104-2. The end pockets 104E are spaced a width 1 W from the side edges of the panels 102-1, 102-2 to provide a 2 W width dimension between pocket 104E of panels 102-1 and pocket 104E of panel 102-2 to match the 2 W width spacing between the pockets 104 on each of the panels 102-1, 102-2. Although a particular embodiment is shown, use is not limited to a particular pattern or size of pockets, nor a uniform pocket size or pattern, nor a particular panel structure.

FIGS. 4A-4B illustrates an embodiment of a pocket chart kit 200 including a pocket chart formed of connected panels 102. As shown in FIG. 4A, the kit includes four panels 102-1, 102-2, 102-3, 102-4 to form four rows 128 of pockets 104, wherein each row incudes eight inner and outer pockets 104-1, 104-2. As shown, the pocket chart 100 includes a heading 202 and subheading 204 along the top row of pockets 104. As shown in FIG. 4B, the kit 200 includes panels 102, connector strips 130, pre-printed cards and inserts 210, 212 as well as blank cards and inserts 214, 216. The pre-printed cards 210 and inserts 212 are pre-printed with information and text for a particular application. The blank card and inserts 214, 216 allows the user to print information on the inserts and cards 214, 216 depending upon user preference and the user's application. The pre-printed and blank inserts 212, 216 are sized for insertion into the clear outer pockets 104-2 and the cards 210, 214 are sized to fit in the inner pockets 104-1. The inserts 212, 216 are smaller than the cards 210, 214 to fit within the outer pockets 104-2 while the cards 210, 214 are sized to extend above the inner pocket 104. In an illustrated embodiment as shown in FIG. 2A, a head dimension HD between rows of pockets 104 is larger than a height of the pockets to provide an extended height to display the content of cards 210, 214 to the user.

In addition as shown in FIG. 4B, the kit 200 includes placards 220 for the heading 202 and subheading(s) 204 of the pocket chart. The placards 220 as shown include a pre-printed or blank placard card 222 having multiple insert tabs 224. The insert tabs 224 are sized and spaced for insertion into adjacent inner pockets 104-1 to removably connect the placards 220 to the pocket chart 100. In the illustrated embodiment, the kit includes a placard 220 having four insert tabs 224 sized for insertion into four pockets across the pocket chart and a placard 220 including two insert tabs 224 sized for insertion into two adjacent pockets.

FIGS. 5A-5B illustrate an embodiment of a chore pocket chart kit 250 for organizing chores or responsibilities for one or more children. As shown, the kit 250 includes four panels 102-1, 102-2, 102-3, 102-4 connected via connector strips 130 as previously described (not shown in FIG. 5A) to provide a weekly chore schedule for up to three children. For applications limited to a single child, two panels 102 having two rows of four pockets may be used instead of the four panels 102 shown in FIG. 5A to provide a weekly chore schedule for up to three children. The four connected panels 102 form four rows 128 of eight pockets 104. The top row of pockets 104 includes a "CHORES" heading 202 and "REDEEM TICKETS FOR" sub-heading 204. The top row as shown also includes bonus pockets. As shown, each row is labeled with a name label and "Sunday-Saturday" labels for the days of the week. For applications limited to a single child, two panels may be used instead of the four panels shown in FIG. 5A. Thus as described, the multiple panel design provides flexibility to adapt the pocket chart for different numbers of users and different user preferences.

The days of the week labels are preprinted inserts 260 and participant's names are written on blank inserts 262 to form name labels. Pre-printed or blank chore cards 252, 254 and ticket cards 256 are inserted into the labeled pockets 104-1 to keep track of chores for each day of the week and provide incentive for completing the chores. The kit 250 includes a wide variety of preprinted chore cards 252 that may be used or the user can create their own chore cards using the blank cards 254 and writing the desired chore on the blank card 254. Illustrative chore cards include "Clean toilet", "Pick up toys", "Put away clothes" and other common chores. The user selects the cards 252, 254 for the desired chores for the week and inserts the cards into the pocket 104-1 for each day of the week. When the chores are complete the cards can be removed or turned over so that the reverse side faces forward. The ticket cards 256 are used to accrue incentive points that can be redeemed for cash, free time, screen time or other rewards. Ticket cards 256 can be held in the name pocket 104-1 when earned and different chores can be assigned different values for different denominations of reward points.

As shown in FIG. 5B, the kit 250 includes pre-printed inserts 260 for Sunday-Monday-Tuesday-Wednesday-Thursday-Friday-Saturday. The inserts 260 are inserted into the outer pockets 104-2 of each row 128 as previously described. The blank inserts are used for the participant's names for each row 128. The kit 250 also includes header and sub-header placards 220 for the "CHORES" and "REDEEM TICKETS" headings 202, 204 as shown. FIGS. 5A-5B including tabs spaced for insertion into adjacent pockets as previously described.

FIGS. 6A-6B illustrate another embodiment of a pocket chart 100 similar to FIGS. 1A-1D formed of two connectable panels 102. As shown in FIG. 6A, the two panels 102-1, 102-2 include form four rows 128 of four pockets 104, although application is not limited to the particular number of rows or pockets shown. FIG. 6C illustrates a pocket chart (reverse side 126 shown in FIG. 6C) formed of six panels 102-1, 102-2, 102-3, 102-4, 102-5, 102-6 and it should be understood that any number of panels can be used depending upon the application.

FIGS. 7A-7B illustrate an embodiment of a chore pocket chart kit 280 utilizing two connectable panels 102-1, 102-2 similar to the embodiment shown in FIGS. 6A-6B. In the embodiment shown, the kit 280 includes a main "CHORE" heading formed of a preprinted placard 220 having two insert tabs 224. The pocket inserts include pre-printed "Morning", "Afternoon" and "Evening" inserts 260 and blank name labels 262. As previously described, chore cards 252 and ticket cards 256 are used to assign chores and to reward participants for completed chores. FIGS. 8A-8B illustrate another embodiment of a chore chart kit 290 similar to FIGS. 7A-7B where the preprinted inserts 260 include "Responsibility", "Work for Tickets" and "Done" labels for assigning and tracking completion of chores. The "Responsibility" label is to assign required chores and the "Work for Tickets" label is to assign chores that if completed will earn rewards.

FIGS. 9A-9C illustrates another embodiment of a panel connected to form a pocket chart. In the embodiment shown, panels 300-1, 300-2 are connected via one or more connector strips 302 to form the pocket chart. Panels 300-1, 300-2 are similar to panels 102 of the previous embodiments and include an obverse side 304 and a reverse side 306. The reverse side 306 is a loop surface forming a plurality of loops of a hook and loop connector and the reverse side 304 includes rows of pockets as previously described (not visible in FIG. 9A). Illustratively the panels 300-1, 300-1 include a loop fabric layer as previously described to form the loop surface on the reverse side 306 of the panels 300-1, 300-2.

As previously described, connector strips 302 attach adjacent panels 300-1, 300-2 to form the pocket chart. The connector strips 302 include an obverse side 310 and a reverse side 312. The obverse side 310 of the connector strip includes a hook surface to connect to loops on the reverse side 306 of panel 300-2. The connector strip 302 is attached to panel 300-1 through spine 314. The spine 314 is formed of an elongate flexible material or fabric having opposed edges 316, 318. As shown the first side edge 316 of the spine 314 is attached to panel 300-1 and the second side edge 318 is attached to connector strip 302 so that the obverse side 310 of the connector strip 302 faces the same direction as the obverse side 304 of the panel 300-1. The hook surface 310 of the connector strip 302 is aligned with the reverse loop surface of adjacent panel 300-2 to connect panel 300-1 to panel 300-2. In illustrative embodiments, the connector strip is attached or sewn to either the obverse side (FIG. 9A) or reverse side (FIG. 9E) of the spine 314. As shown in FIG. 9B, the obverse and reverse surfaces 304, 306 of panels 300-1, 300-2 when connected are flush to provide a generally flat profile for the pocket chart.

In an illustrated embodiment shown in FIG. 9C, the connector strip 302 also includes reverse side hooks on the reverse side 312 of the connector strip 302 to fold the connector strip 302 and attach the connector strip to the reverse side 306 of the panel 300-1 when not in use as shown in FIG. 9D. In an illustrated embodiment, the connector strip 302 is formed of a single sided hook material such as a Duragrip® brand hook fabric providing the obverse hook surface and one or more hook patches 320 (only one hook patch shown in FIG. 9E) connected to the reverse side 312 of the hook material or connector strip 302 as shown in FIG. 9E. In an illustrative embodiment shown in FIG. 9G, the reverse side of the connector strips 302-1, 302-2 include at least two hook patches 320 at opposed ends of the connector strips 302-1, 302-2.

FIGS. 9F-9G illustrate an embodiment of the panel 300 with connector strips 302-1, 302-2 attached to the panel through flexible spines 314-1, 314-2. Panel 300 includes a top edge, a bottom edge, left side edge and right side edge similar to the embodiments previously described, which when the panels 300 are connected form the top, bottom and side edges of the pocket chart. In the illustrated embodiment, the panel 300 includes a top connector strip 302-1 connected to the top edge of the panel 300 through spine 314-1 and a side connector strip 302-2 connected to right side edge through spine 314-2 to join multiple panels to form the pocket chart 100A illustrated in FIG. 9H. While a particular embodiment is shown in FIGS. 9F-9G, application is not limited to the embodiment shown nor a particular size, length or number of connector strips nor a connector strip extending an entire edge length. Further, it should be understood that the connector strips can be attached to any of the edges of the panels to connect adjacent panels to form the pocket chart and application is not limited to the connector strips 302-1, 302-2 along the top and right side edges as shown.

As shown in FIG. 9H, panels 300-1, 300-2, 300-3 and 300-4 are connected to form pocket chart 100A. As shown, the side connector strips 302-2 of panels 300-1 and 300-3 connect to the reverse side loops of panels 300-2, 300-4 and the top connector strips 302-1 of panels 300-3, 300-4 connect to the reverse side loops of panels 300-1, 300-2 to connect panels 300-1, 300-2, 300-3, 300-4. In the illustrated embodiment, each of the connector strips 302-1, 302-2 include hooks on the reverse side to connect to the loop surface on panels 302-1, 302-2, 302-3, 302-4. In the embodiment shown, the top connector strips 302-1 of panels 300-1, 300-2 are folded over so that the reverse side hooks connect to the reverse side loops of panels 300-1, 300-2 as illustrated in FIG. 9D. As shown in FIGS. 9E-9F, the ends of the connector strips 302-1, 302-2 are angled so that the connector strips 302-1, 302-2 fold flat to attach the hooks to the reverse side loops as illustrated in FIG. 9H.

Application of the pocket chart described is not limited to the illustrated hook patch or a particular number of hook patches 320, nor a particular shape or sized connector strip as shown in FIGS. 9F-9H. In particular in an alternate embodiment a dual sided hook material can be used. Further, application is not limited to a flexible spine 314 and in an alternate embodiment the one or more connector strips 302 are attached to the panels directly or through a rigid spine to connect adjacent panels in a flush manner as will be appreciated by those skilled in the art.

Thus, as described, the present application provides a configurable pocket chart and kit including a first and second panels connectable through a connector strip coupled to the reverse sides of the first and second panels. In particular in one embodiment the hooks on connector strip connect to the loops on the reverse surfaces of the first and second panels and in another embodiment, the connector strip is attached to the reverse side of the first panel (e.g. sewn) and connected to the second panel via connection of hooks on the connector strip and loops on the reverse side of the second panel.

While the present application discloses illustrative embodiments, application is not limited to the illustrated embodiments and as will be appreciated by those skilled in the art, changes and modifications can be made to the pocket chart panels, connector strips and kit elements within the scope of the invention. In particular, application is not limited to the specific structure or loop layer as described. Additionally, any number of or combination of panels can be connected depending upon the desired shape and size. In additional, the pocket chart kit can include one or more pens or writing instruments to add text and information to the blank inserts and cards and hanging elements, hanging hooks and hanging strips as described.

What is claimed is:
1. A kit comprising:
    a plurality of flexible panels haying a plurality of rows of pockets each row including a plurality of spaced pockets;

a hook and loop connector to connect the plurality of panels to form a pocket chart;

a plurality of cards sized for insertion into the pockets; and at least one placard including a plurality of tabs sized and spaced to insert into adjacent pockets of the plurality of panels to connect the placard to the pocket chart.

2. The kit of claim 1 wherein plurality of rows of pockets include inner and outer pockets and the outer pockets are formed of a clear material and the kit comprising inserts sized for insertion into the outer pockets and the plurality of cards are sized for insertion into the inner pockets.

3. The kit of claim 1 wherein the plurality of panels include an obverse side and a reverse side and the hook and loop connector includes a connector strip having a hook surface configured to attach to a loop surface on the reverse side of the plurality of flexible panels and the plurality of rows of pockets are formed on the obverse side of the panels.

4. The kit of claim 3 wherein the plurality of panels include a loop fabric layer having a loop side and the loop surface is formed by the loop side of the loop fabric layer.

5. The kit of claim 3 wherein the plurality of panels include a first panel and a second panel and the connector strip has a width sized to overlap the loop surface on the first panel and the loop surface on the second panel to attach the hooks on an obverse surface of the connector strip to the loop surfaces of the first and second panels.

6. The kit of claim 3 wherein the plurality of panels include a first panel and a second panel and the connector strip is attached to the second panel through a spine and the hook surface of the connector strip attaches to the loop surface on the reverse side of the first panel.

7. A kit comprising:

a plurality of panels including an obverse side and a reverse side, and the obverse side including a plurality of rows of pockets, each row including a plurality of spaced inner and outer pockets, the outer pockets being formed of a clear material and a height dimension between adjacent rows of pockets is larger than a height dimension of the pockets;

a hook and loop connector for connecting adjacent panels to form a pocket chart;

a plurality of cards sized for insertion into the inner pockets and having a height dimension sized to extend above a top of the inner pockets; and a plurality of inserts sized for insertion into the outer pockets.

8. The kit of claim 7 wherein the inner pockets are formed of a clear material.

9. The kit of claim 7 wherein the plurality of cards includes a plurality of pre-printed cards with chores or responsibilities and a plurality of printable blank cards.

10. The kit of claim 7 wherein the inserts include a plurality of pre-printed labels and a plurality of printable blank labels.

11. The kit of claim 7 wherein the plurality of panels include a loop fabric layer forming a loop surface on the reverse side of the plurality of panels and the hook and loop connector includes a connector strip having a hook surface to connect to the loop surface on the reverse side of the plurality of panels.

* * * * *